(12) United States Patent
Kolachala et al.

(10) Patent No.: US 10,656,964 B2
(45) Date of Patent: May 19, 2020

(54) DYNAMIC PARALLELIZATION OF A CALCULATION PROCESS

(71) Applicant: Oracle International Corporation, Redwood Shores, CA (US)

(72) Inventors: Subrahmanyam Kolachala, Duluth, GA (US); Jianwu Xu, Alpharetta, GA (US); Tak Hong, Marietta, GA (US); Larry E. Roddenberry, Atlanta, GA (US); Dengsheng Huang, Marietta, GA (US); Mehdi Khosravi, Duluth, GA (US); Philip Geoffrey Holland, Cambridge, MA (US); Bimal Patel, Isleworth (GB); Anoop Mohan, Cumming, GA (US); Kiran Kumar Shetty, Atlanta, GA (US); Weigang Lang, Duluth, GA (US); Eric Bloemeke, Alpharetta, GA (US); Zhibin Huang, Atlanta, GA (US); Scott D. Coulter, Marietta, GA (US)

(73) Assignee: Oracle International Corporation, Redwood Shores, CA (US)

( * ) Notice: Subject to any disclaimer, the term of this patent is extended or adjusted under 35 U.S.C. 154(b) by 203 days.

(21) Appl. No.: 15/596,306

(22) Filed: May 16, 2017

(65) Prior Publication Data
US 2018/0336062 A1  Nov. 22, 2018

(51) Int. Cl.
*G06F 9/48* (2006.01)
*G06F 8/41* (2018.01)
(Continued)

(52) U.S. Cl.
CPC ............ *G06F 9/4881* (2013.01); *G06F 8/456* (2013.01); *G06N 5/04* (2013.01); *G06Q 10/10* (2013.01)

(58) Field of Classification Search
CPC .............................. G06F 8/456; G06F 9/4881
See application file for complete search history.

(56) References Cited

U.S. PATENT DOCUMENTS

| 5,664,172 A | 9/1997 | Antoshenkov |
| 5,745,894 A | 4/1998 | Burrows et al. |

(Continued)

OTHER PUBLICATIONS

Judith Meskill, Oracle Retail Predictive Application Server Administration Guide for the Classic Client, Dec. 2014, Oracle (Year: 2014).*

(Continued)

*Primary Examiner* — Chat C Do
*Assistant Examiner* — Douglas M Slachta
(74) *Attorney, Agent, or Firm* — Potomac Law Group

(57) ABSTRACT

A system for generating a parallel calculation plan to evaluate a rule-set or a rule-based expression list by spilling the list of rule-based expressions into multiple task units and reconfiguring all independent task units at the same calculation levels into several parallelized task groups such that task units within each task group may be scheduled for parallel execution across a cluster of processing nodes. The parallelization may be dynamically determined based on generated tasks but may further be subject to an additional layer of parallelization based on range-based splitting of each task into multiple parallel executable subtasks. The final parallelized calculation plan may include a set of sequentially ordered task groups based on logical dependencies and problem partitioning with information regarding parallelized execution of each task group.

20 Claims, 6 Drawing Sheets

(51) Int. Cl.
*G06N 5/04* (2006.01)
*G06Q 10/10* (2012.01)

(56) References Cited

U.S. PATENT DOCUMENTS

| | | | |
|---|---|---|---|
| 5,884,299 A | 3/1999 | Ramesh et al. | |
| 6,161,103 A | 12/2000 | Rauer et al. | |
| 6,199,093 B1* | 3/2001 | Yokoya | G06F 8/451 |
| | | | 718/100 |
| 6,473,763 B1 | 10/2002 | Corl, Jr. et al. | |
| 6,732,094 B1 | 5/2004 | Cousins et al. | |
| 7,069,197 B1* | 6/2006 | Saidane | G06Q 30/00 |
| | | | 700/19 |
| 7,433,886 B2 | 10/2008 | Rathakrishnan et al. | |
| 7,779,008 B2* | 8/2010 | Dageville | G06F 9/4494 |
| | | | 707/737 |
| 7,873,939 B2* | 1/2011 | Tian | G06F 8/20 |
| | | | 717/101 |
| 8,041,670 B2 | 10/2011 | Bakalash et al. | |
| 8,321,373 B2 | 11/2012 | Bakalash et al. | |
| 8,676,843 B2 | 3/2014 | Bayliss et al. | |
| 9,329,899 B2* | 5/2016 | Ailamaki | G06F 9/4843 |
| 9,405,808 B2 | 8/2016 | Pike et al. | |
| 9,417,935 B2* | 8/2016 | Gounares | G06F 9/546 |
| 2002/0038229 A1 | 3/2002 | Shah et al. | |
| 2002/0091707 A1 | 7/2002 | Keller | |
| 2004/0122844 A1 | 6/2004 | Malloy et al. | |
| 2006/0218123 A1* | 9/2006 | Chowdhuri | G06F 16/24532 |
| 2007/0220525 A1* | 9/2007 | State | G06F 9/4881 |
| | | | 718/107 |
| 2008/0184211 A1* | 7/2008 | Nickolls | G06F 8/456 |
| | | | 717/140 |
| 2008/0201721 A1* | 8/2008 | Little | G06F 8/453 |
| | | | 718/106 |
| 2008/0270447 A1 | 10/2008 | Arends et al. | |
| 2008/0270710 A1* | 10/2008 | Kwon | G06F 12/109 |
| | | | 711/147 |
| 2008/0313610 A1* | 12/2008 | Ramsey | G06F 8/314 |
| | | | 717/115 |
| 2010/0131955 A1* | 5/2010 | Brent | G06F 9/4843 |
| | | | 718/103 |
| 2012/0042319 A1* | 2/2012 | Hildrum | G06F 9/4881 |
| | | | 718/104 |
| 2012/0166440 A1* | 6/2012 | Shmueli | G06F 16/322 |
| | | | 707/737 |
| 2012/0180067 A1* | 7/2012 | Funaoka | G06F 8/456 |
| | | | 718/106 |
| 2014/0095537 A1 | 4/2014 | Park et al. | |
| 2014/0099553 A1 | 4/2014 | Park et al. | |
| 2014/0250054 A1 | 9/2014 | Jones | |
| 2014/0380322 A1* | 12/2014 | Ailamaki | G06F 9/4843 |
| | | | 718/102 |
| 2015/0143381 A1* | 5/2015 | Chin | G06F 9/485 |
| | | | 718/104 |
| 2015/0261580 A1* | 9/2015 | Shau | H04L 67/10 |
| | | | 718/106 |
| 2016/0291942 A1* | 10/2016 | Hutchison | G06F 8/451 |
| 2016/0328273 A1* | 11/2016 | Molka | G06F 9/505 |
| 2017/0308411 A1* | 10/2017 | Brill | G06F 9/5044 |
| 2018/0150299 A1* | 5/2018 | Balle | H04L 41/0816 |
| 2018/0165335 A1* | 6/2018 | Kong | G06F 16/244 |
| 2018/0246765 A1* | 8/2018 | Chen | G06F 9/4881 |

OTHER PUBLICATIONS

Anonymous: "Automatic parallelization—Wikipedia", Mar. 25, 2017, XP055490831, Retrieved from the internet: URL: https://en.wikipedia.org/w/index.php?title=Automatic_parallelization&oldid772158811 [retrieved on Jul. 6, 2018].

Anonymous: "Oracle Retail Predictive Application Server (RPAS)—Wikipedia", May 1, 2017, XP055490834, Retrieved from the Internet: URL: https://en.wikipedia.org/w/index.php?title=Oracle_Retail_Predictive_Application_Server_(RPAS)&oldid=778251295 [retrieved on Jul. 6, 2018].

Judith Meskill, "Oracle Retail Predictive Application Server Administration Guide for the Classic Client", Release 14.1, E59120-01, Oracle 2014.

International Search Report issued in the corresponding International Application No. PCT/US2018/029769, dated Nov. 19, 2019.

* cited by examiner

DYNAMIC PARALLELIZATION OF A CALCULATION PROCESS

FIELD

One embodiment is directed generally to a planning system, and in particular, to improving the calculation process in planning systems.

BACKGROUND INFORMATION

Planning systems help retailers plan and manage sales, operating margin and inventory turns across a retail business. In such systems, business logic may be expressed using 'Rules'. For example, the rule: Sales=Price*Units, represents 'Sales' as a function of 'Price' per unit and the number of 'Units' sold, and evaluates it by multiplying 'Price' per unit with the number of 'Units' sold. Each term in a rule maps to a data object in a planning database. A large planning system may involve hundreds to thousands of such rules. These rules are either pre-configured or dynamically generated. Such rules must be re-evaluated frequently, sometimes online and sometimes in batch form. Due to the large volume of data and the large number of rules defined in a system, the performance of the computation becomes a key aspect of the overall performance of a planning system.

SUMMARY

One embodiment is directed to a system that generates a parallel calculation plan to evaluate a set of rule-based expressions. The system splits the set of rule-based expressions into a plurality of task units. The system then rearranges the plurality of task units into a sequential set of parallelizable task groups, where a sequential ordering is determined by logical dependencies and problem partitioning associated with the set of rule-based expressions.

DETAILED DESCRIPTION

Figure 1:
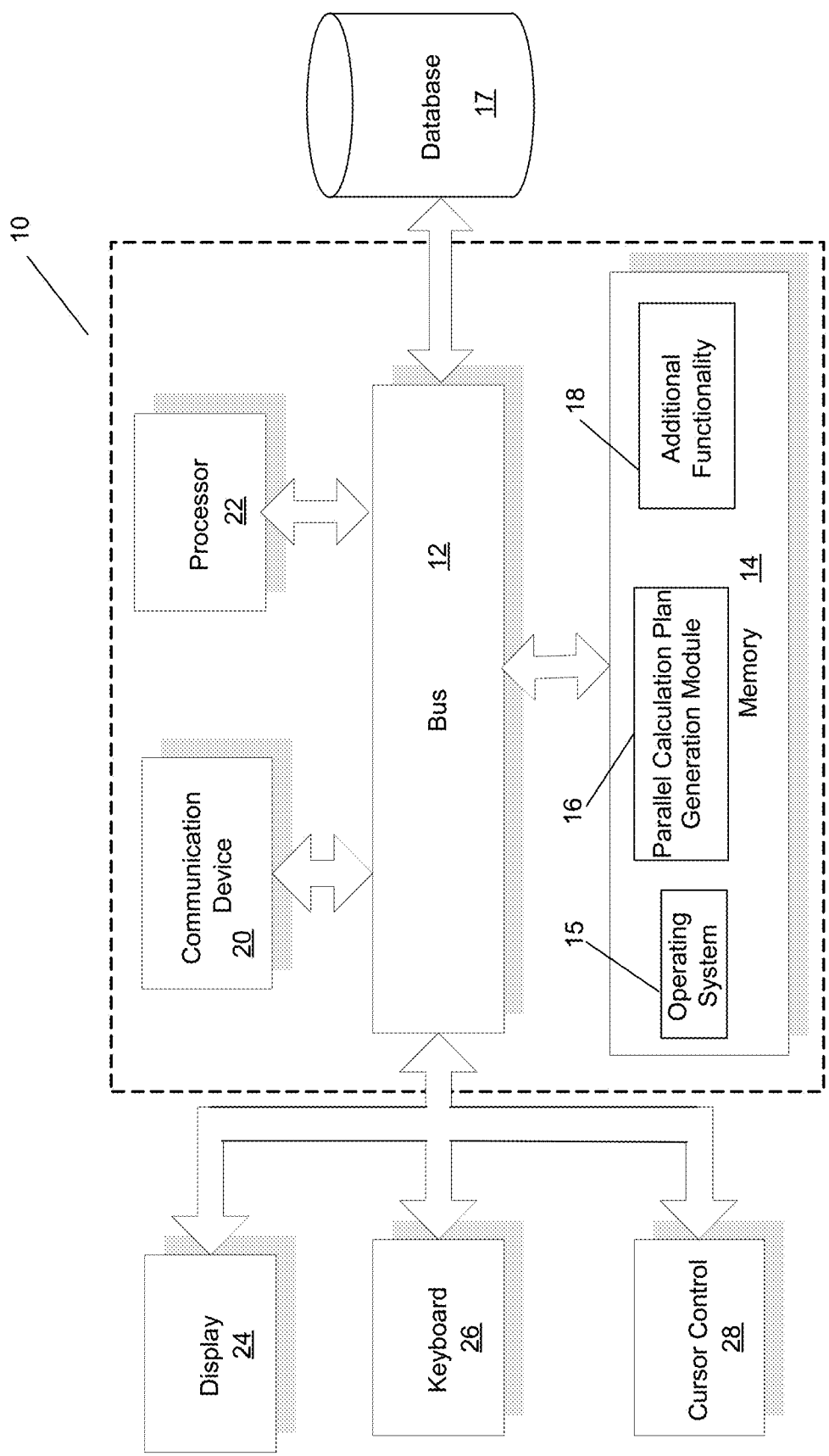
FIG. 1 is a block diagram of a computer server/system that includes a parallel calculation plan generation module for optimizing a computation process, in accordance to an embodiment of the present invention.

Evaluation of rule-based expressions for planning and management of analytics is a sequential process as determined by the logical inter-dependency between expressions. Evaluation of a set of expressions often involves a sequential pattern because evaluation of certain expressions may depend upon calculation outcome of expressions appearing elsewhere in the list. Therefore, calculation engines associated with existing computational platforms identify the existing logical dependencies and accordingly sequentialize the calculation process required to carry out the evaluation of a rule set or a rule-based expression list. However, sequential evaluation of rule sets has not kept pace with the development of new technology and high-performance hardware architectures that offer highly scalable computing and processing platform for big data analytics and management. There is a need to improve the speed and the scalability associated with the evaluation of rule-based expression lists or rule-sets using an innovative approach that enables exploitation of newer high-performance computing and processing architectures.

Earlier generation of solutions tend to attack the performance problem by 'Scaling Up' (i.e., utilizing more expensive hardware). In a cloud approach however, existing solutions tend to attack the performance problem by 'Scaling Horizontally' (i.e., adding more commodity hardware and running the execution in parallel). For rule-based calculations, the key issue in the horizontal scaling approach is the difficulty associated with performing rule based calculations in parallel. In existing solutions, it is the application developer or designer that specifies how the calculation can be partitioned and carried out in parallel, if ever possible.

Embodiments of the present invention implement parallelization for the calculation of rule-based expressions by breaking up sequentially executed calculation steps into a sequential set of parallelized task groups. Parallelizing the calculation process of rule-based expressions as disclosed by embodiments of the present invention is a novel approach that is capable of taking full advantage of newer high-performance scalable computation and processing platforms, and results in substantial performance improvement, in terms of speed, time and efficiency, over the conventional approach.

It is noted that, in accordance to an embodiment of the present invention, a parallelized or parallelizable task or subtask group refers to a group of tasks or subtasks involving logically independent operations at the same hierarchical calculation level that may be executed in parallel across multiple processing nodes or using multiple processing threads. A task or a task unit refers to a simple unit of operation that can be executed individually within the execution plan.

It is further noted that, in accordance to an embodiment of the present invention, a sequential set of parallelized or parallelizable task groups refers to a plurality of parallelized task groups arranged according to a sequential execution order, such that parallel execution of each parallelized task group depends upon completion of one or more parallelized task groups appearing earlier in the sequential set. The sequential order may be dictated by logical dependencies among expressions in a rule set and/or problem partitioning (i.e., hierarchical level of the associated calculation).

Embodiments introduce parallelization in the execution of sequential aspects of the calculation process to evaluate rule-based expression lists. Embodiments introduce parallelization among tasks and operations involved in the evaluation of sequential steps, while maintaining the sequential order enforced by sets of logical dependencies inherent in a rule-based expression list. As a result, each calculation step involved in a sequentially executed set of calculation steps will evaluate at greater speed and with higher efficiency in terms of time and resource utilization. Compared with the conventional rule-set evaluation approach which involves performing multiple sequential calculations steps, embodiments of the present invention significantly improve the time and resource utilization associated with rule-set evaluation process by, for example, restructuring the sequential calculation steps as a set of one or more parallelized task groups.

As stated above, existing solutions rely upon an application developer or analyst to specify how the calculation process can be carried out in parallel either directly or indirectly. This is generally achieved by using a programming application programming interface ("API") or script, such as, "Spark" or "Java Stream API", or by specifying the execution flow as a pipe line (e.g., "Apache Pig" or "Crunch"). A common feature of these existing methodologies by which parallelization is implemented into the execution process is that they must be pre-defined. Embodiments of the present invention describe a unique way of dynamically parallelizing the execution process involved in rule-set evaluation that substantially improves performance and reduces operation time.

Embodiments improve rule-set calculation performance by automatically analyzing and transforming a set of rule-based expressions into sets of computational tasks that can be carried out in parallel across one or more computer clusters. Embodiments analyze a set of rule-based expressions, break up the rules into smaller tasks based on logical dependency and problem partitioning, and then automatically generate a parallel execution plan for the set of rules based on the tasks generated and problem partitioning. The execution plan is then dispatched and executed in parallel, utilizing a computer cluster.

Existing technologies, such as the Scalable Processor Architecture ("SPARC"), implement parallelization through a programming language. It is therefore a programmer that specifies the dependencies in the calculation process and determines the order of execution. In contrast, embodiments of the present invention disclose a highly configurable and dynamic approach to computation parallelization that involves generating a parallel execution plan for a set of rule-based expressions. Therefore, in accordance to embodiments of the present invention, dependencies are dynamically addressed based on the rule-based expressions being evaluated.

In embodiments of the present invention, calculations associated with evaluating a rule-set are split into a plurality of smaller tasks and arranged into a plurality of parallelized task groups. Tasks arranged into a parallelized task group comprise components of each rule-based expression that may be executed in parallel. These components may be pulled out in front and executed in parallel as part of one or more parallelized task group which may be further broken down into one more parallelized subtask groups. One distinction with respect to SPARC is that disclosed embodiments perform parallelization based on expression as well as range.

FIG. 1 is a block diagram of a computer server/system (i.e., system 10) in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a database management system, system 10 may be a server that in general has no need for a display 24 or one or more other components shown in FIG. 1.

System 10 includes a bus 12 or other communication mechanism for communicating information, and a processor 22 coupled to bus 12 for processing information. Processor 22 may also comprise a cluster of processing nodes such that each node may be scheduled independently to enable processor 22 to carry out multiple calculations in parallel. Processor 22 may be any type of general or specific purpose processor. System 10 further includes a memory 14 for storing information and instructions to be executed by processor 22. Memory 14 may also include one or more parallelized execution tables or calculation plans for one or more rule-sets, which may be scheduled for execution across multiple processing nodes in parallel. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a parallel calculation plan generation module 16 for generating a parallelized execution scheme, and all other functionality disclosed herein. System 10 can be part of a larger system, such as added functionality to the Oracle Database system from Oracle Corp, or any database management system. Therefore, system 10 can include one or more additional functional modules such as additional functionality module 18. A database 17 is coupled to bus 12 to provide centralized storage for parallel calculation plan generation module 16 and additional functionality modules 18 (i.e., Database management module.) In one embodiment, database 17 is a non-structured query language ("NoSQL") database and the parallel calculation plan generation module 16, is implemented as part of the Oracle Retail Predictive Application Server ("RPAS"). These exemplary features, namely NoSQL database and RPAS, associated with different embodiments of the invention are described in further details below.

The Oracle Retail Predictive Application Server (commonly referred to as "RPAS") is a configurable software platform for developing forecasting and planning applications. The RPAS platform provides capabilities such as a multidimensional database structure batch and online processing, a configurable slice-and-dice user interface, a sophisticated configurable calculation engine, user security and utility functions such as importing and exporting.

RPAS is the foundation for a significant number of applications that are part of the Oracle Retail solution footprint, such as Oracle Retail Demand Forecasting, Oracle Merchandise Financial Planning, Oracle Assortment Planning, Oracle Item Planning, Oracle Size Profile Optimization, Oracle Replenishment Optimization and Oracle Advanced Inventory Planning. RPAS currently offers two data persistence options: a proprietary datastore based on Oracle Berkeley DB, or an Oracle RDBMS.

A NoSQL database provides a mechanism for storage and retrieval of data which is modeled in means other than the tabular relations used in relational databases. NoSQL databases are increasingly used in big data and real-time web applications. NoSQL systems are also sometimes called "Not only SQL" to emphasize that they may support SQL-like query languages. Motivations for this approach include: simplicity of design, simpler "horizontal" scaling to clusters of machines (which is a problem for relational databases), and finer control over availability. The data structures used by NoSQL databases (e.g., key-value, wide column, graph, or document) are different from those used by default in relational databases, making some operations faster in NoSQL. The particular suitability of a given NoSQL database depends on the problem it must solve. Sometimes the data structures used by NoSQL databases are also viewed as "more flexible" than relational database tables.

In general, embodiments of the present invention induce parallelization during each sequential calculation step involved in rule-set evaluation by splitting up each step into a plurality of independent tasks and sub-tasks that may be run in parallel wherever possible, and wherever not possible the subtasks run in sequence.

Figure 2:
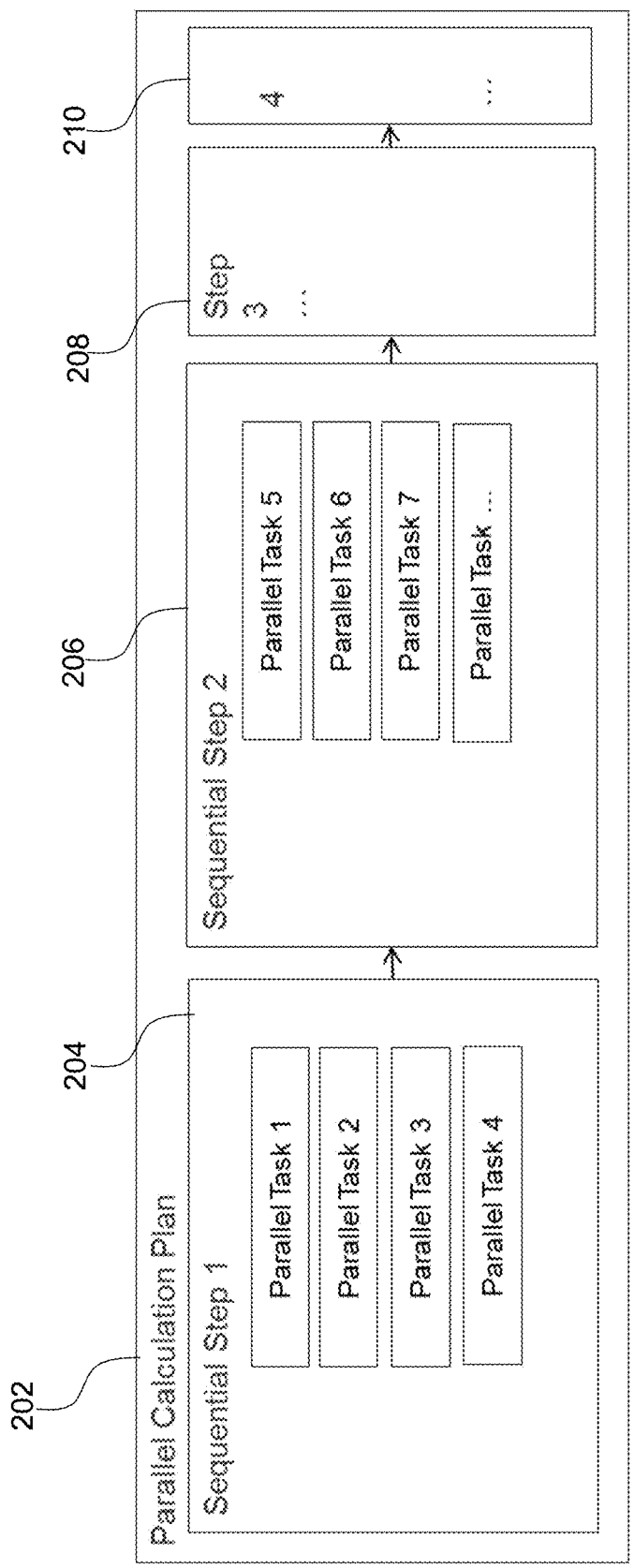
FIG. 2 is a block diagram of a calculation parallelization plan, in accordance to an embodiment of the present invention.

FIG. 2 illustrates an overview of a parallelization plan, in accordance with an embodiment of the present invention. The parallel calculation plan 202 includes one or more sequential calculation steps to carry out the evaluation of a rule-based expression list or rule set as specified by 204, 206, 208 and 210 in FIG. 2. The sequential steps maintain a sequential relationship so that each sequential calculation step requires the completion of the previous step before it can execute. However each sequential step may be performed as a set of parallel tasks. A task is a simple unit of operation that can be executed individually within the execution plan.

Referencing calculation plan 202 in FIG. 2, first sequential step 204 is broken up into parallel tasks 1-4 that may be executed independently and at the same time. As a result of this parallel execution, first sequential step 204 will complete faster, resulting in an earlier initiation of second sequential step 206. Similarly, the second sequential step 206 may execute as a set of parallelizable tasks as shown in FIG. 2 resulting in additional speed up in initiation of the third sequential step 208. Same operations follow similarly for the fourth sequential step 210. In this way, the calculation plan 202 is broken up into a sequence of parallelizable task groups that maintain the sequential ordering of calculation steps while offering significant speed up through parallelized execution of sequential steps.

Figure 3:
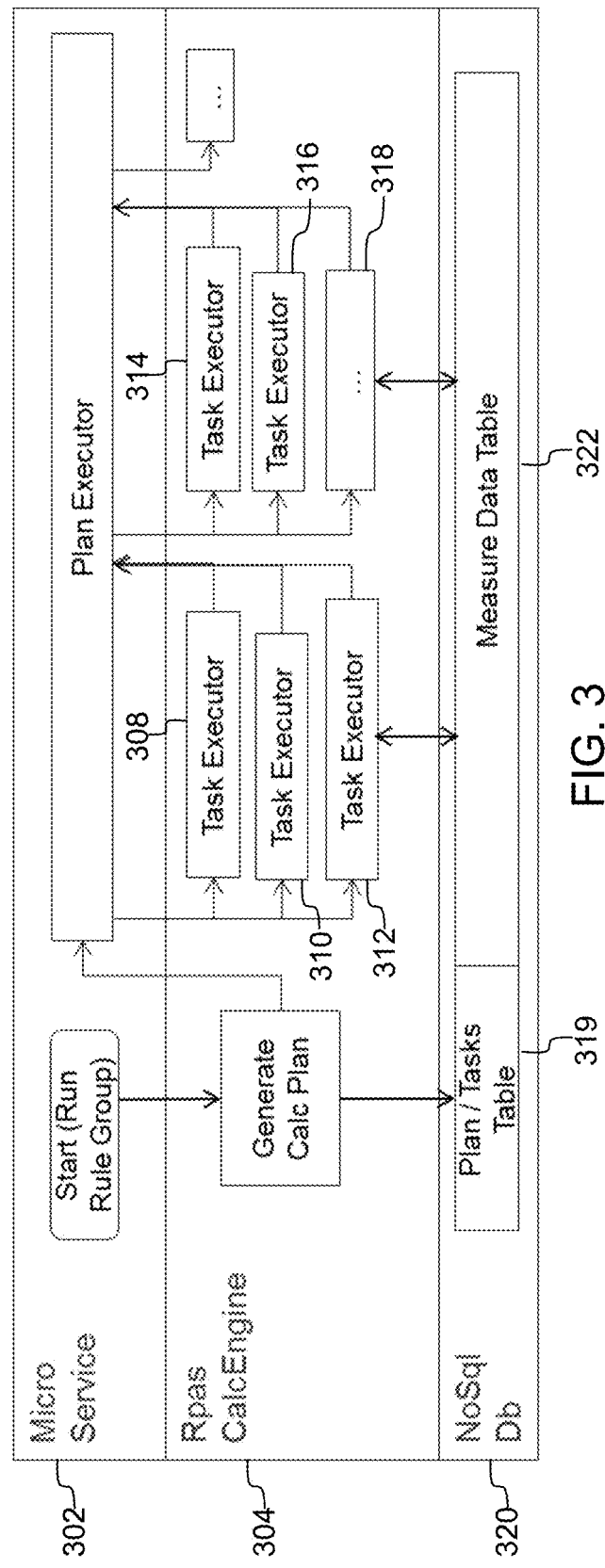
FIG. 3 is an operational flow diagram of a calculation parallelization plan implementation on an RPAS platform, in accordance to an embodiment of the present invention.

FIG. 3 illustrates the operational flow of a parallelized calculation process, according with an embodiment. A micro service layer 302 on the server side will initiate the rule-set evaluation process. The instruction is dispatched to a RPAS layer 304 where a parallelized calculation plan is generated by a calculation engine (CalcEngine). The CalcEngine logically determines the sequential and parallel execution pattern of the tasks required to carry out the evaluation of a rule-set and accordingly generates an execution plan. The CalcEngine implemented on the back end does not have task scheduling functionality, therefore once the plan is generated by the CalcEngine it is passed back to the middle-tier micro service layer 302 for implementation and distribution across a cluster of processing nodes for parallel execution. For example, if the execution plan generated by the CalcEngine specifies a particular sequential step to, for example, include 500 parallel tasks that may be run in parallel, micro service layer 302 may distribute the operation over 500 nodes assigning one computation task to each node. As illustrated in FIG. 3, calculation plan execution is directed by micro service layer 302 which schedules the parallel execution of first set of task across task executor 308, 310 and 310 in the RPAS layer. Upon completion of the execution plan executor is notified so that a subsequent set of parallel tasks associated with the next sequential step of the calculation may be scheduled and assigned to task executor 314, 316 and 318. In this way the tasks included in the sequential step will execute simultaneously across multiple task executors, thus significantly speeding up the evaluation of the rule-set.

As illustrated in FIG. 3, the microservice layer (middle tier) 302 schedules parallelized execution of tasks while ensuring that sequential order of calculation is maintained as each set of parallel tasks are only scheduled upon receiving a completion notification from task executors running the previous parallelized task group. The calculation plan is stored in a plan/task table 319 at a NoSQL database layer 320. Task execution includes reading measure data from a measure data table and updating a measure data table with the outcome of task execution. Therefore, NoSql database layer 320 also includes a measure data table 320. A measure represents an entity that holds data for a particular type. For example a measure may be created for "sales". The sales measure will then contain relevant data (i.e., sales data) for all the stock keeping units ("SKU").

The initial rule-based expression list, generated by a RuleEngine is broken up and regrouped as multiple sequentially ordered calculation steps. The sequential order of the calculation steps is dictated by logical dependency among calculation steps and intersection of measures to be evaluated in the expression list. As such, all expressions that do not depend upon the outcome of other expressions, for example, A=5 or B=today, may be pooled together into one sequential step and executed in parallel. However, certain expressions may depend upon the evaluation outcome of other expressions. For example, the evaluation of an expression 'A=B.top' requires the calculation of 'B' to be completed first. Therefore, evaluation of 'B' must precede evaluation of 'A' in this case and hence sequential calculation order must reflect this sequential relationship.

As described above, one criteria for determining the sequential ordering and the number of sequential calculation steps necessary for evaluation of a rule set is the hierarchical or intersecting levels at which a calculation is carried out. For example the calculation of a measure at a higher level may require aggregation of values associated with that measure at a lower level. Calculation level changes may involve a change in the level of parallelism and hence necessitate a new calculation step. Therefore calculations associated with inter-level evaluation of an expression are evaluated in different sequential steps, while calculations associated with expressions at the same level may be evaluated in parallel in a same step. Logical dependencies among expressions in a rule-set in addition to the associated calculation level as described above, serve as barriers delineating the multiple sequential calculation steps associated with complete evaluation of a rule-set according to an embodiment of the present invention.

Once a rule-based expression list is broken up and re-grouped into a set of sequential calculation steps based on existing logical dependencies and intersections or level changes among associated calculations, the next step is to perform the calculations associated with each step. A rule-based expression may be represented as an equation or expression including a left hand side ("LHS") measure (term) expressed as a function of one or more right hand side ("RHS") measures (terms). Therefore carrying out a calculation associated with a sequential calculation step may involve the evaluation of a LHS measure as a function of the RHS measures. This action may first require an aggregation sub-task to be carried out in order to quantify the RHS measures. The execution of an aggregation sub-task may further require the completion of an initialization sub-task which includes clearing of one or more LHS measure instance from associated memory locations and the creation of data structures for new RHS measure instances at the aggregate level. Therefore a calculation step may include a sequentially ordered set of subtasks namely an initialization subtask to clean up measure data and create a new data structure for storing aggregate level measure instances, an aggregation subtask to generate aggregate level measure instances and finally a calculation subtask to evaluate the actual expression using aggregate level measure instances as parameters.

Multiple initialization subtasks may be performed simultaneously due to the independent nature of the operation. Similarly, multiple aggregation subtasks involving independent measure instances may be performed in parallel. Therefore, depending on the type of calculation involved, some calculation steps may not include one or both of the initialization and/or aggregation subtasks. Therefore, the formulation of the calculation plan is a dynamic process. At the end of the calculation plan, following the last calculation step, a final clear up task may be executed.

Figure 4:
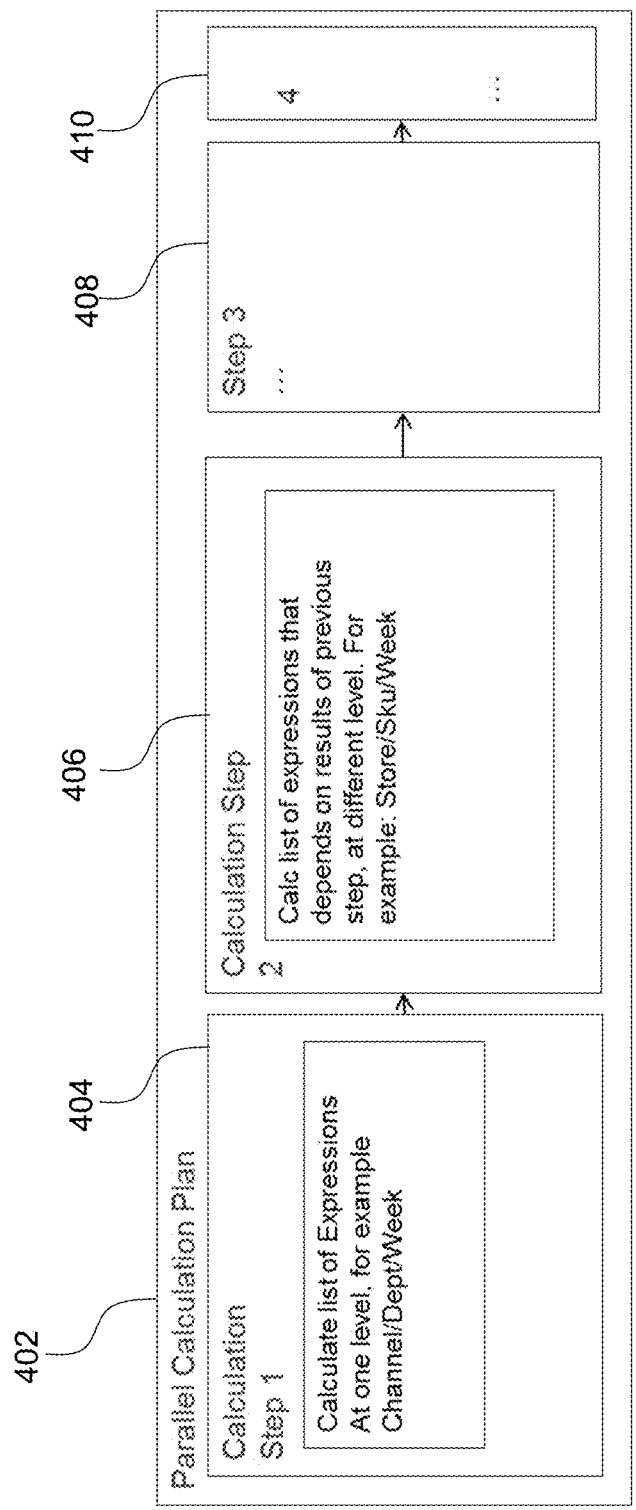
FIG. 4 is an illustration of a sequential ordering criteria in a parallel calculation plan, in accordance to an embodiment of the present invention.

FIG. 4 illustrates a parallel calculation plan 402, in accordance to an embodiment. As illustrated in FIG. 4, calculation plan 402 is broken up into a set of sequential calculation steps 404 through 410 based on dependency and/or intersection or problem partitioning criteria.

Figure 5:
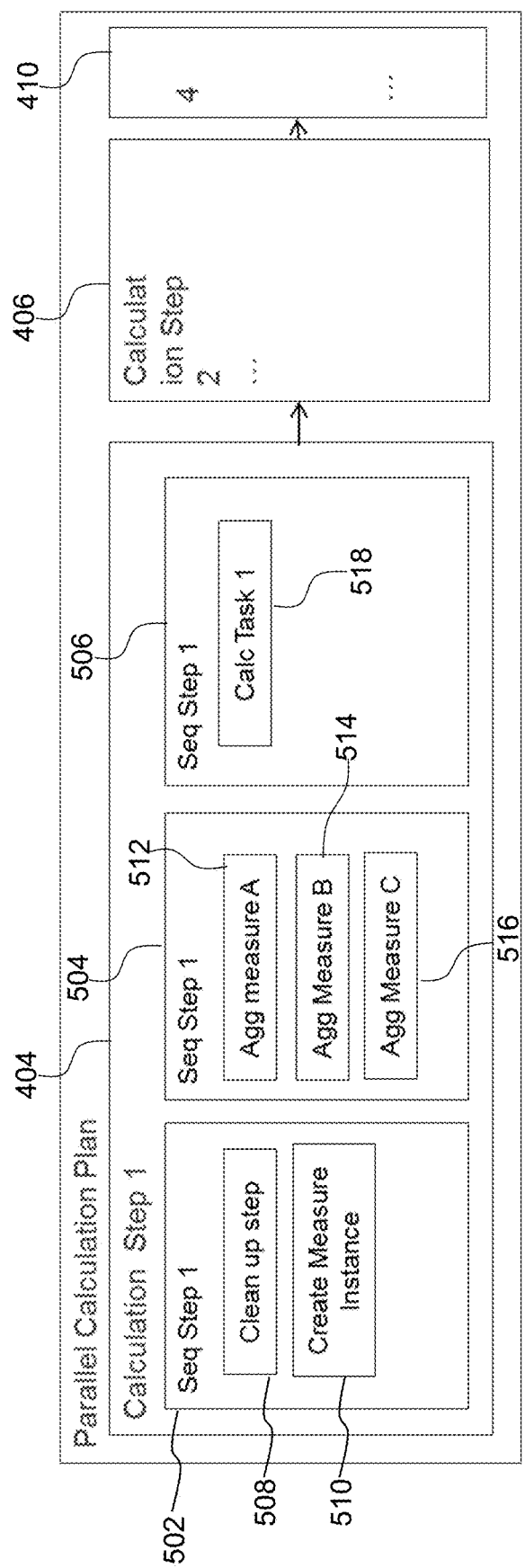
FIG. 5 is a block diagram of a measure-based parallelized calculation plan, in accordance to an embodiment of the present invention.

FIG. 5 illustrates a parallel partitioning of the first sequential step 404 into a sequence of three sub-steps including parallelized task groups 502, 504 and 506, respectively. Parallelized task group 502 carries out the initialization operation which includes cleaning up tasks 508 and data structure creating tasks 510. Clean up task 508 may represent measure clearing tasks associated with all the expressions in a rule-set being evaluated that may be arranged into initialization step 502 and executed in parallel. Data structure or measure creation task 510 associated with all the expressions in a rule-set being evaluated are also arranged into the initialization sub-step 502 and executed in parallel with clean up task 508. According to an embodiment of the invention illustrated in FIG. 5, initialization sub-step 502 must precede the execution of the second parallelized task group 504 which involves aggregating measures A, B and C, carried out by aggregation subtask 512, 514 and 516. For example designated memory blocks must be cleared and required memory must be allocated and initialized at 502 for storing aggregated level instances of measures A, B and C prior to aggregating measures A, B and C at 504.

As stated above, data structure or measure instance creation tasks 510 may occur at the same time and in parallel with measure clearing up tasks 508 to significantly speed up the initialization process.

The second sequential sub-step that include the parallelized task group 504 involves aggregation of measure data, specifically aggregation subtask 512 for aggregating measure A, aggregation subtask 514 for aggregating measure B and aggregation subtask 516 for aggregating measure C. An aggregation operation may involve summing up all the data for all stock keeping units ("SKU") across multiple stores and/or departments associated with a planning system. This may be a very time-consuming task. Therefore creating a separate aggregation tasks for each measure that may be aggregated independently and running all such aggregation tasks in parallel may significantly improve the evaluation time of the rule set. Since aggregation subtask 512, 514 and 516 for aggregating measures A, B and C respectively, as shown in FIG. 5 involve aggregating data for different independent measures they may be performed in parallel.

Upon the completion of the aggregation step 504 and once the data required for the actual evaluation of one or more expressions in a rule-set is made available, calculation task 518 in calculation task group 506 may be performed to evaluate an expression in the rule-set using aggregate level measure values. Calculation tasks that involve no common components may be performed in parallel. The same set of three sequential sub-steps may then be repeated for the calculation steps 2, 3, 4.

As stated above, initialization, aggregation and calculation sub-steps follow a sequential order of execution. However each sub-step may include multiple subtasks, associated with different expressions in the rule-set, scheduled to execute in parallel. For example, the initialization process may involve the creation of multiple subtasks to clean up some or all of the LHS measure instances in the rule-set while simultaneously creating RHS measure instances at an aggregated level associated with some or all of the expressions in the rule-set. Therefore cleanup and create tasks for a plurality of expressions in the rule-set may be arranged into a single initialization sub-step and executed in parallel. Similarly, an aggregation sub-step may include collection of aggregated RHS measure instances from all expressions in a rule-set and creation of multiple subtasks for all aggregation tasks that may be run in parallel. Calculation sub-steps to evaluate one or more expressions may also be parallelized based on existing dependencies and/or calculation levels among expressions in a rule-set. A final clean up task may run after all calculations are completed in a current batch or even if a batch fails in the middle of execution. A final clean up task removes all aggregated measure instances created in the current batch.

In addition to dependency based parallelization, each sequential sub-step in a parallelized task group may further parallelize by range. Range-based parallelization involves parallelizing the execution of a single subtask across multiple independent domains, entities or channels (i.e., stores, departments, etc.) at the same hierarchical level. The single subtask can include multiple expressions, an aggregation, etc. Range-based parallelization adds an additional layer of parallelization to the calculation plan, hence further speeding up rule-set evaluation process.

Figure 6:
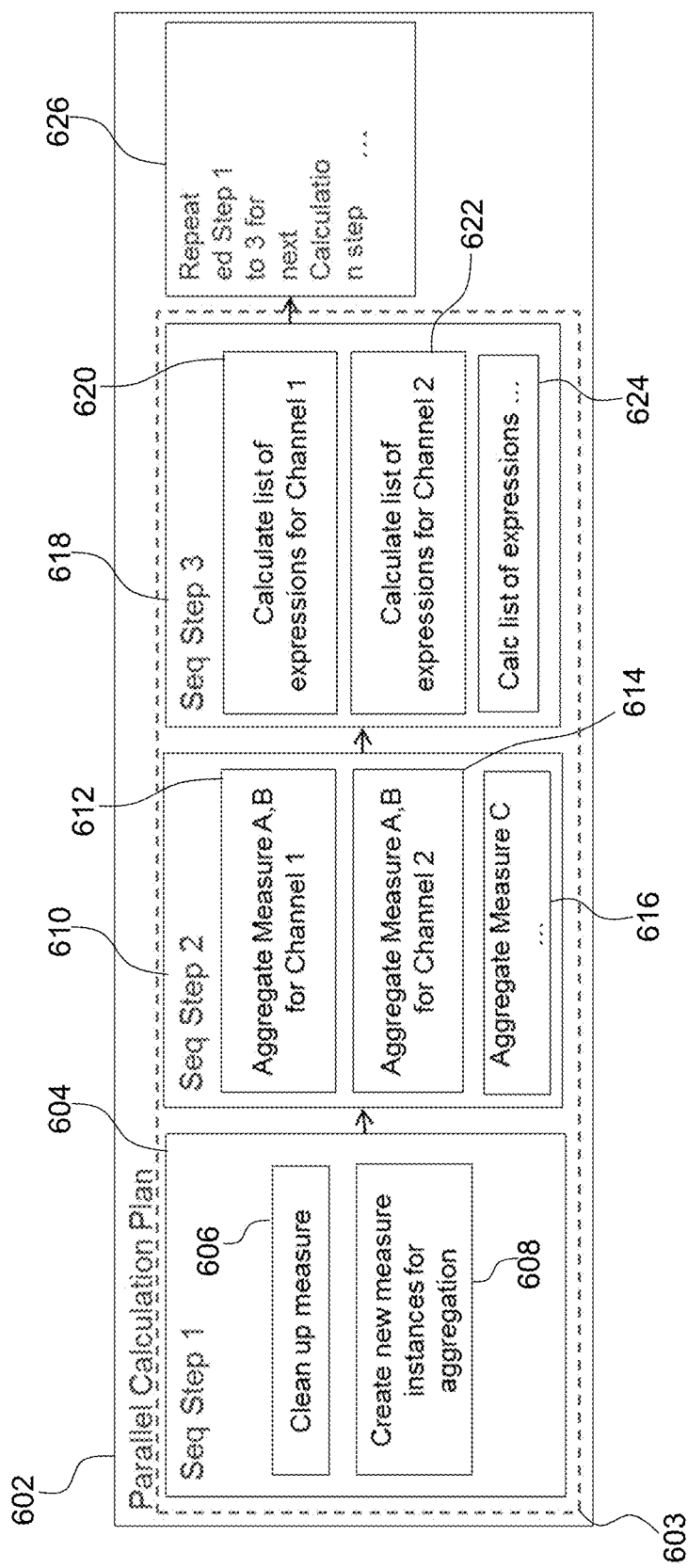
FIG. 6 is a block diagram of a measure-based and range-based parallelized calculation plan, in accordance to an embodiment of the present invention.

FIG. 6 illustrates a final calculation plan 602 that includes both measure based and range based parallelization, according to an embodiment of the present invention. Parallelized execution pattern 603 of the first sequential calculation step is split into a sequence of three parallelized task groups for carrying out the first set of initialization, aggregation and calculation operations, respectively. Parallelized execution pattern 603 includes a first sequential sub-step 604 associated with measure data cleanup operations 606 and new aggregated level measure instance creation operations 608. First sequential sub-step 604 of the parallelized execution pattern 603 constitutes the parallel execution of all the initialization operations associated with all the rule-based expressions in a rule set. This includes all the cleanup and new instance creation operations that may be parallelized across a rule-set. Second sequential sub-step or parallelized task group 610 of the parallelized execution pattern 603 includes aggregation subtasks for measures A and B which is further partitioned by channels into parallelized subtask group 612 which aggregates data associated with measures A and B for channel 1, parallelized subtask group 614 which aggregates data associated with measures A and B for channel 2, and parallelized subtask group 616 which aggregates data associated with a measure C for one or more channels.

It is noted that parallelized subtask group 612, 614 and 616 are scheduled for simultaneous execution as specified by the parallelized execution pattern 603 associated with the first sequential calculation step of the calculation plan 602. Therefore, the second sequential sub-step 610 (aggregation sub-step) of the first sequential calculation step in the calculation plan 602 is parallelized, first by measure, across measures A, B and measure C, and then by range to perform the parallel aggregation of measures A, B and C across multiple channels simultaneously.

In general, if there are, for example, n channels in the calculation domain, n parallel tasks may be created for aggregating a measure across all n channels in parallel. Calculation plan 602 in FIG. 6 utilizes two main parallelization schemes, namely a dependency-based parallelization scheme in addition to a partition or range-based parallelization scheme.

The parallelized execution pattern 603 associated with the first sequential calculation step of the calculation plan 602 also includes a third sequential sub-step 618. Third sequential sub-step 618 of the parallelized execution pattern 603 includes a parallelized subtask group 620 for evaluating a list of expressions for channel 1, a parallelized subtask group 622 for evaluating a list of expressions for channel 2, and a parallelized subtask group 624 for evaluating a list of expressions for one or more other channels. It is noted that the parallelized subtask groups 620, 622 and 624 are scheduled for parallel execution as specified by the parallel execution pattern 603 associated with the first sequential calculation step of the calculation plan 602. Therefore the third sequential sub-step 618 (calculation sub-step) of the first sequential calculation step in the calculation plan 602 is parallelized, first by measure, across measures A, B and C, and then by range to perform the parallel calculation of a list of expressions across multiple channels simultaneously. The same set or a subset of parallelized initialization, aggregation and calculation task groups may then be performed for other calculation steps in the calculation plan as shown by 626.

According to an embodiment of the invention, sequential aggregation tasks are created for all measures with an empty based array, source ranged aggregation tasks are created if aggregating to scalar, two dimensional ranged aggregation tasks are created if the outermost dimension is small, and finally destination ranged aggregation tasks are created by the destination's outermost dimension.

According to an embodiment of the invention, range information for any range-parallelizable tasks is set up according to the following specification: For a source ranged aggregation, the range is set up by the outermost dimension of the source array. For destination ranged aggregation, the range is set up by outermost dimension of the destination array. For two dimensional ranged aggregations, the range is set up by the outermost and middle dimensions of the destination array. For non-scalar calculations, the range is set up by the outermost dimension of the LHS measure instance.

According to an embodiment of the invention, the parallelized calculation plan including measure based (expression based) and range-based parallelization schemes may be flattened into a linear expression of sequential steps with information about each step that identifies one or more sets of parallelizable tasks (measure-based and/or range-based) within each sequential step along with information about each task that identifies one or more sets of parallelizable subtasks (measure-based and/or range-based) within each task.

According to an embodiment of the invention, the flattened calculation plan, including a linear set of sequential calculation steps along with associated calculation step parallelization information to enable substantially faster evaluation of one or more rule-sets, may be stored on a storage module such as a NoSQL database and implemented on an RPAS platform.

A sample pseudo-code describing one particular implementation of an embodiment of the invention is as follows:

```
//      Generating the Parallel Calcultion Plan
// Input is a list of expressions pre-ordered by Rule Engine
generate_plan(expr_list)
{
        for (expr in expr_list)
        {
                if expr does not depends on others, then
                {
                        pull this expr out from expr_list
                        put this expr in independ_expr_list
                }
        } if independ_expr_list is not empty, then
        {
                generate_measure_based_parallel_plan_for_ind_expressions(
                        independent_expr_list
```

```
            )
        } generate_range_based_parallel_plan(expr_list)
}

// Extract the range parallelizable dimension of the expression
dimension_name
extract_parallelizable_level(expr)
{
    if (expr is special expression )
    {
        return outermost dimension of this expr's rangeableIntx
    }
    else
    {
        is the expression a constant expression?
        {
            //    Constant expression is considered as scalar, identified by empty string
            return ""
        }
        else
        {
            return outermost dimension of LHS measure instance's intersection
        }
```

```
        }
    } generate_measure_based_parallel_plan_for_ind_expressions(
        independent_expr_list)
{
    // Break up all expressions by level of parallelization
    create map of dimension name to list of expressions
    for (expr in independent_expr_list)
    {
        parallelizable_dim = extract_parallelizable_level (expr)
        add expr to the map entry for parallelizable_dim
    } for each entry in the map
    {
        let dim_name be the key in the entry
        let sub_expr_list be expression list of the entry if size of sub_expr_list is too large
        we further break sub_expr_list to multiple smaller sub_expr_list
        for each smaller sub_expr_list or just the sub_expr_list itself
        {
            generate_plan_for_same_level_same_group(dim_name, sub_expr_list)
        }
    }
```

```
} generate_range_based_parallel_plan(expr_list)
{
    let outerdim_divided_list be a list of Pair (
        dimension name,
        list of expressions)

for (expr in expr_list)
    {
        outer_dim_name = extract_parallelizable_level (expr)

if outer_dim_name is different than the dim name of the last element in outerdim_divided_list
        {
            append a new pair of (outer_dim_name, empty expr list) to outerdim_divided_list
        } append expr to the expression list of the last element in outerdim_divided_list
    } for each pair of (dim_name, expr_list) in the outerdim_divided_list
    {
        generate_plan_for_same_level(dim_name, expr_list)
    }
```

*store the generated plan and return*

}

// Generate the Range Parallelized Calculation Plan

*generate_plan_for_same_level(parallelizable_dim, expr_list)*

{

*if (parallelizable_dim is empty)*

{

// Handle the scalar evaluation case

*generate_plan_for_same_level_same_group(parallelizable_dim, expr_list)*

}

*else*

{

// Parallelization by range, first break up based on barrier calculations

*let expr_list_list be a list of list of expressions*

*for (expr in expr_list)*

{

*let the current_expr_list be the last element in the expr_list_list*

*first check barrier calculation*

*collect this expr's RHS (right handside) measure instances*

*if any of the RHS measure instance satisfies:*

```
                    1.    RHS is calculated by a previous
expression in current_expr_list
                    2.    And is at aggregated level above
parallelizable_dim
                then
                {
                    //    Expr must be evaluated after all
expressions in current_expr_list are evaluated
                        append a new expression list to the expr_list_list
                        reset the current_expr_list to the new expression
list just created
                }
                append expr to current_expr_list
            } for (each sub_list in the expr_list_list)
            {
                generate_plan_for_same_level_same_group(parallelizable_dim, sub_list)
            }
        }
    }
} generate_plan_for_same_level_same_group(parallelizable_dim, expr_list)
{
    //    First collect all measure instance that needs to be aggregated or
```

*cleaned*

*let lhs_set be the set of LHS measure instances*

*let agg_map be a map that maps from aggregated intersection to measure instance*

*for (expr in expr_list)*
*{*

*collect measure instances in the expr,*

*if the measure instance is at aggregated level*

*add an entry to the agg_map, key is the aggregated intersection,*
        *value is the set of measure instances*

*collect LHS measure instances in the expr to lhs_set*

*}*

*//   Handle the trivial case - no further parallelization is needed*

*if agg_map is empty, and parallelizable_dim is also empty*

*{*

*create a new calculation step*

*create a sequential calculation task in this step*

*add the expr_list to this new task*

*the seqential calculation task will simply evaluate all expressions in sequential mode, no further parallelization needed*

*return;*

*}*

```
//      Handle aggregation
if (agg_map is not empty, or lhs_set is not empty)
{
        create a new step of calculation (init_step), append it to current plan
        also create a new task (init_task) that does the measure creation and clean up
        add init_task to init_step for (all measure instances in the lhs_set and the agg_map)
        {
                add the measure instance to the init_task
                the init task, when executed, will create the measure instance if not exist
                or clean it up if it already exists
        }
}

//      Create aggregation step
let seq_agg_map, src_range_agg_map, dst_range_agg_map, twodim_range_agg_map be 4 maps, each maps intersection to a set of measure instances
        if the agg_map is not empty
        {
        for each intersection, set of measure instances pair in the agg_map
                if the measure to aggregate has no data
                {
                        // Use regular sequential aggregation if no data in involved
``` add this intersection and its associated set of measures to seq_agg_map

} else if the intersection is scalar, like aggregating everything to all product / all location

{

//  Use source ranged aggregation add this intersection and its associated set of measures to src_range_agg_map

} else if the outer most dimension has small number of positions, defined by a system threshold but next outer dimension has larger number of positions

{

//  Use Two Dim Range Aggregation add this intersection and its associated set of measures to twodim_range_agg_map

} else

{

//  Range by Destination as default add the intersection and its associated set of measures to dst_range_agg_map

}

}

Create a new calculation step (agg_step), append it to current plan

*if seq_agg_map is not empty*

*{*

*create a sequential aggregation task, put all measures in the seq_agg_map to this task*

*add this task to the current aggregation step*

*}*

*if src_range_agg_map, dst_range_agg_map, twodim_range_agg_map is not empty*

*{*

*for each (intersection, set of measures pair) in the three maps*

*{*

*if per intersection, the set of measures is too large*

*break up the set of measures to smaller sets*

*create a source range agg task for entries in src_range_agg_map*

*or a dst range agg task for entries in dst_range_agg_map*

*or a twodim range agg task for entries in twodim_range_agg_map*

*add the set of measures to this task*

*add the task to current agg step*

*further parallelize the task by range by adding partition information to it*

*}*

*}*

*create a Calculation step and append the step to current plan*

*if (parallelizable_dim is empty)*

*{*

*create a sequential calc task*

*add the expr_list to the sequential calc task*

*add the task to the calculation step*

*}*

*else*

*{*

*create a range parallelized calculation task*

*add the expr_list to the range based calc task*

*add the task to the calculation step*

*further parallelize the task by range by adding partition information to it*

*}*

*}*

As disclosed, embodiments allow for parallelization of calculation process based on expression properties, with further performance enhancement enabled by simultaneous range-based parallelization of the computation.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to generate a parallel calculation plan to evaluate a set of rule-based expressions, the generation comprising:
   splitting the set of rule-based expressions into a plurality of task units, wherein at least a portion of the task units comprise a measure from the set of rule-based expressions;
   arranging the plurality of task units into a sequential set of parallelizable task groups, wherein a sequential ordering of the parallelizable task groups is determined by logical dependencies problem partitioning associated with the set of rule-based expressions, and at least two task units from the plurality of task units that comprise independent measures are arranged in a same parallelizable task group; and
   generating the parallel calculation plan comprising a sequential execution ordering of the parallelizable task groups and a parallel execution ordering of the task units within each of the parallelizable task group, wherein the parallel calculation plan is scheduled for parallel execution across a cluster of computers, the parallel execution ordering includes parallel execution of the at least two task units that comprise independent measures, and at least one of the two task units aggregates data over one of the independent measures; and
   causing the parallel calculation plan to be executed.

2. The non-transitory computer readable medium of claim 1, wherein the plurality of task units comprise one or more initialization, aggregation or calculation operations used to evaluate the rule-based expressions in the set of rule-based expression.

3. The non-transitory computer readable medium of claim 1, further comprising splitting one or more parallelizable task groups from the sequential set of parallelizable task groups into a parallel set of parallelizable subtask groups.

4. The non-transitory computer readable medium of claim 3, wherein the parallel set of parallelizable subtask groups is generated by a range-based parallelization of the one or more parallelizable task groups from the sequential set of parallelizable task groups.

5. The non-transitory computer readable medium of claim 4, wherein at least one of the parallelizable subtask groups comprises a same measure and is generated by a range-based parallelization of the one or more parallelizable task groups.

6. The non-transitory computer readable medium of claim 1, wherein the parallel calculation plan is generated by a calculations engine and dispatched to a middle-tier layer for scheduling and execution.

7. The non-transitory computer readable medium of claim 1, wherein the parallel calculation plan is generated by a calculation engine of a Retail Predictive Application Server (RPAS).

8. The non-transitory computer readable medium of claim 1, wherein a measure represents an entity that holds data of a particular type, and the independent measures comprised by the two task units are non-intersecting measures.

9. A computer-implemented method for generating a parallel calculation plan to evaluate a set of rule-based expressions, the method comprising:
   splitting the set of rule-based expressions into a plurality of task units, wherein at least a portion of the task units comprise a measure from the set of rule-based expressions;
   arranging the plurality of task units into a sequential set of parallelizable task groups, wherein a sequential ordering of the parallelizable task groups is determined by logical dependencies and problem partitioning associated with the set of rule-based expressions, and at least two task units from the plurality of task units that comprise independent measures are arranged in a same parallelizable task group; and
   generating the parallel calculation plan comprising a sequential execution ordering of the parallelizable task groups and a parallel execution ordering of the task units within each of the parallelizable task group, wherein the parallel calculation plan is scheduled for parallel execution across a cluster of computers, the parallel execution ordering includes parallel execution of the at least two task units that comprise independent measures, and at least one of the two task units aggregates data over one of the independent measures; and
   causing the parallel calculation plan to be executed.

10. The computer-implemented method of claim 9, wherein the plurality of task units comprises one or more initialization, aggregation or calculation operations used to evaluate the rule-based expressions in the set of rule-based expression.

11. The computer-implemented method of claim 9, further comprising splitting one or more parallelizable task groups from the sequential set of parallelizable task groups into a parallel set of parallelizable subtask groups.

12. The computer-implemented method of claim 11, wherein the parallel set of parallelizable subtask groups is generated by a range-based parallelization of the one or more parallelizable task groups from the sequential set of parallelizable task groups.

13. The computer-implemented method of claim 12, wherein at least one of the parallelizable subtask groups comprises a same measure and is generated by a range-based parallelization of the one or more parallelizable task groups.

14. The computer-implemented method of claim 9, wherein a measure represents an entity that holds data of a particular type, and the independent measures comprised by the two task units are non-intersecting measures.

15. A system for generating a parallel calculation plan to evaluate a set of rule-based expressions, comprising:
   a processor and memory storing instructions, wherein the processor is configured to:
   split one or more sets of rule-based expressions into a plurality of task units, wherein at least a portion of the task units comprise a measure from the set of rule-based expressions;
   arrange the plurality of task units into a sequential set of parallelizable task groups, wherein a sequential ordering of the parallelizable task groups is determined by logical dependencies and problem partitioning associated with the set of rule-based expressions, and at least two task units from the plurality of task units that comprise independent measures are arranged in a same parallelizable task group; and generate the parallel calculation plan comprising a sequential execution ordering of the parallelizable task groups and a parallel execution ordering of the task units within each of the parallelizable task group, wherein the parallel calculation plan is scheduled for parallel execution across a cluster of computers, the parallel execution ordering includes parallel execution of the at least two task units that comprise independent measures, and at least one of the two task units aggregates data over one of the independent measures; and cause the parallel calculation plan to be executed.

16. The system of claim 15, wherein the plurality of task units comprises one or more initialization, aggregation or calculation operations used to evaluate the rule-based expressions in the set of rule-based expression.

17. The system of claim 15, wherein the second unit further splits one or more parallelizable task groups from the sequential set of parallelizable task groups into a parallel set of parallelizable subtask groups.

18. The system of claim 17, wherein the parallel set of parallelizable subtask groups is generated by a range-based parallelization of the one or more parallelizable task groups from the sequential set of parallelizable task groups.

19. The system of claim 15, wherein the first unit and the second units constitute a calculation engine, and wherein the parallel calculation plan generated by the calculation engine is dispatched to a middle-tier level for scheduling and execution.

20. The system of claim 19, wherein the calculation engine is part of a Retail Predictive Applications Server (RPAS), and wherein the parallel calculation plan is scheduled for parallel execution across a cluster of computers.

\* \* \* \* \*